United States Patent [19]

Winkelbauer et al.

[11] Patent Number: 4,627,945

[45] Date of Patent: Dec. 9, 1986

[54] METHOD OF MANUFACTURING AN INJECTION MOLDED REFRACTORY SHAPE AND COMPOSITION THEREOF

[75] Inventors: Howard M. Winkelbauer, McKeesport; Ke-Chin Wang, Pittsburgh; Frank H. Walther, Jr., Upper St. Clair; Donald F. Stock, Pittsburgh, all of Pa.

[73] Assignee: Dresser Industries, Inc., Dallas, Tex.

[21] Appl. No.: 635,076

[22] Filed: Jul. 27, 1984

[51] Int. Cl.[4] .................................. B29C 45/73
[52] U.S. Cl. .................................. 264/29.5; 164/349; 164/529; 264/62; 264/63; 264/328.1; 264/328.2; 423/345; 423/346; 501/100
[58] Field of Search .................. 264/29.1, 29.5, 328.2, 264/44, 63, 328.1, 62; 164/529, 349; 106/44; 423/345, 346; 501/101, 99, 100

[56] References Cited

U.S. PATENT DOCUMENTS

| | | | |
|---|---|---|---|
| 3,429,486 | 2/1969 | Cope et al. | 264/29.5 |
| 3,600,480 | 8/1971 | Parsons | 264/29.1 |
| 3,947,550 | 3/1976 | Fitchmun | 264/29.7 |
| 3,979,214 | 9/1976 | Trostel, Jr. | 264/60 |
| 4,028,453 | 6/1977 | Miller et al. | 264/63 |
| 4,041,117 | 8/1977 | Prochazka | 264/63 |
| 4,044,110 | 8/1977 | Noakes et al. | 264/328.2 |
| 4,154,787 | 5/1979 | Brown | 264/63 |
| 4,283,360 | 8/1981 | Henmi et al. | 264/63 |
| 4,510,191 | 4/1985 | Kagami et al. | 264/63 |

FOREIGN PATENT DOCUMENTS

| | | | |
|---|---|---|---|
| 663538 | 5/1963 | Canada | 264/63 |
| 1911537 | 9/1970 | Fed. Rep. of Germany | 264/29.1 |
| 51-25507 | 3/1976 | Japan | 264/63 |
| 53-137214 | 11/1978 | Japan | 264/63 |
| 58-194780 | 11/1983 | Japan | 264/63 |
| 1402988 | 8/1975 | United Kingdom | 264/63 |

Primary Examiner—Jeffery Thurlow

[57] ABSTRACT

An alumina-carbon shape is manufactured from a composition comprising 1–8 weight percent fine silicon, 1–16 weight percent reactive alumina, 1–30 weight percent calcined fluidized bed coke, 1–30 weight percent of a spalling inhibiting additive, and the balance of the mix synthetic alumina, plus the additions of 5–10 weight percent of a high carbon yielding resin as a molding vehicle and 0.5–4 weight percent solvent, and up to 2 weight percent of a low temperature curing agent, such as, paraformaldehyde or hydrochloric acid. The mix is formed at ambient temperature into a shape through an injection molding process. Solidification is accomplished by curing in the mold at a temperature less than 100° C. After stripping the shape from the mold, the solvents are removed from the shape by drying at a temperature above 100° C. The shapes are then heated to a temperature above 550° C. to coke the resin. The shapes may be tar impregnated to decrease coked porosity and to increase their resistance to mold powder.

10 Claims, 1 Drawing Figure

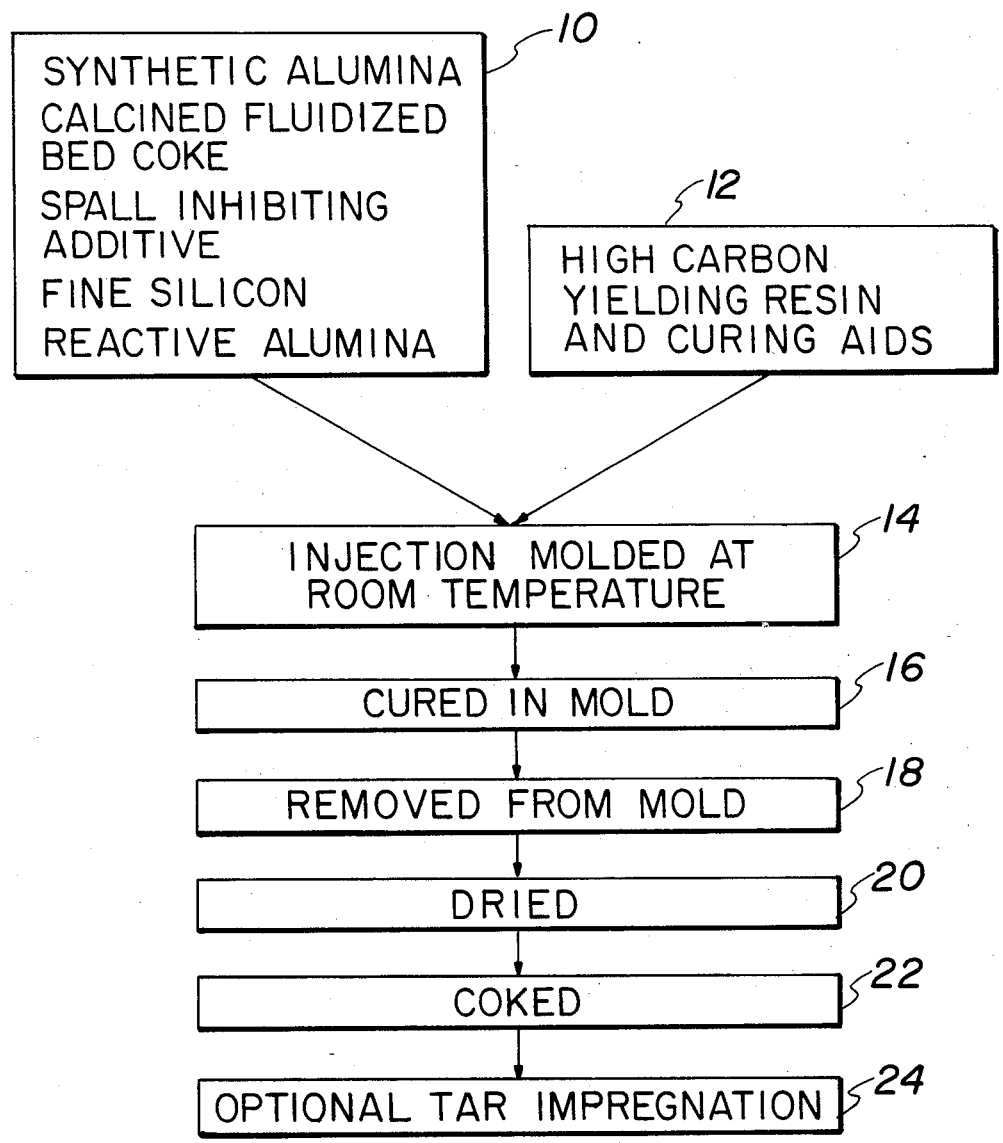

METHOD OF MANUFACTURING AN INJECTION MOLDED REFRACTORY SHAPE AND COMPOSITION THEREOF

TECHNICAL FIELD

This invention relates to a composition and process for the production of a refractory shape useful for conveying molten metals.

BACKGROUND OF THE INVENTION

Fused silica tubes are often used for shrouding molten metal during continuous casting. These tubes are made either by slip casting or by injection molding; see for example U.S. Pat. No. 4,011,299 and W. German Patent No. 26,33,309. The main advantage of such tubes is excellent resistance to thermal shock. Their service life, however, is limited to a few heats because of wear caused by devitrification, pyroplastic flow of silica, reduction of silica by elements in the steel, and corrosive attack by molten mold powder.

In an effort to increase service life, the steel industry has recently tried shroud tubes manufactured from an alumina-graphite composition. These tubes contain from 15 to 30 weight percent flake graphite, and are made by isostatic pressing. These tubes are resistant to the erosive action of molten steel and to the reducing elements in the steel (Al, Mn, Si). Their main disadvantages, however, are high manufacturing cost, a tendency to form a network of alumina crystals along the bore during service which impedes metal flow, and susceptibility to corrosive attack by mold powder.

Improvements have been recently made to increase the mold powder resistance of these tubes by addition of zirconia-containing compounds to the formulation. Also, efforts have been made to limit the tendency to form alumina growths by adding lime or dolomite to the formulation. However, a serious drawback remains—the high cost of manufacture of such tubes. Isopressing is a very capital and labor intensive means of production. Often the tubes require machining on a lathe after isopressing to achieve dimensional specifications.

As an alternative to manufacturing the tubes by isopressing, it would be desirable to form them by injection molding techniques. Injection molding is desirable because of its relatively low capital investment and its high rate of production. However, because of the non-wetting nature of flake graphite, injection molding of alumina-graphite compositions requires extremely high binder levels regardless of the molding vehicle used. Use of high binder levels results in undesirable physical properties. Laboratory experiments showed that binder levels of at least 20% were necessary in mixes which contained flake graphite before an injectable consistency was achieved. Many attempts were made to mask the surface of flake graphite by encapsulating the graphite in a film of resin, gelatin or by coating the surface with silicon carbide. None of these attempts were successful in decreasing the binder requirement.

Additionally, in conventional injection molding processes, waxes or low carbon-yielding resins, such as polystyrene or polyethylene, are chosen as molding vehicles because they are solids at room temperature and become liquid at elevated temperatures. The main disadvantages of using these vehicles are that they do not provide a permanent bond. The shape must be heated to very high sintering temperatures to initiate bonding.

In view of the deficiencies in utilizing graphite and low carbon-yielding resins heretofore enumerated, it was decided that a new composition should be formulated for manufacturing shroud tubes. Many different types of coarse carbon were tested; however, only calcined fluidized bed coke could be used in injection molding processes without requiring extremely high binder levels. It was found that as little as 10% binder was needed to produce a moldable consistency when calcined fluidized bed coke was used in a mix instead of flake graphite. This discovery was quite unexpected since it is generally understood that carbon cannot be wetted. It is suspected that the spherical structure of calcined fluidized bed coke allows it to be easily wetted.

Fine silicon metal was added to the mix to protect the carbon from oxidation and to react with fine carbon to form secondary silicon carbide during coking, which enhances the strength of the tube. Furthermore, high carbon yielding resins were used as the molding vehicles. These types of resins, if pyrolysized under reducing conditions, produce a carbon char which is known to provide excellent strength in refractories, without the need for high temperature sintering.

SUMMARY OF THE INVENTION

Accordingly, it is the principal object of this invention to obtain a new formulation for use in injection molding shroud tubes.

It is a further object of this invention to form shroud tubes made from an alumina-carbon composition by utilizing injection molding techniques.

Another object of this invention is to prepare an injectable alumina-carbon mix at ambient temperature by using a liquid resin composed of a mixture of di- and tri-hydroxy diphenyl and other high molecular weight phenolic compounds, and solidifying the shape under the confines of the mold by adding paraformaldehyde to the mix.

Another object of this invention is to prepare an injectable alumina-carbon mix at ambient temperature by using a low viscosity liquid phenolic resin as the molding vehicle and solidifying the shape under the confines of the mold by adding concentrate hydrochloric acid to the mix.

These and other objects of the present invention are obtained in a composition for manufacturing a resin bonded alumina-carbon shape comprising 1–8 weight percent fine silicon; 1–16 weight percent reactive alumina; 1–30 weight percent calcined fluidized bed coke; 1–30 weight percent of a spall-inhibiting additive; and the balance of the mix synthetic alumina, plus the additions of 5–10 weight percent of a high carbon yielding resin as a molding vehicle; and 0.5–2 weight percent solvent, and up to 2 weight percent of a low temperature curing agent, such as paraformaldehyde or hydrochloric acid.

The mix as described hereinabove, is formed into a shape through an injection molding process. Mix preparation and molding occur at room temperature. After injection, the temperature of the mold and mix is increased to a temperature less than the boiling point of water. This slight increase in temperature is sufficient to initiate a partial cure which allows the solidified shape to be stripped from the mold. After stripping, the shape is safely dried above the boiling point of water to fully cure the shape.

DESCRIPTION OF THE DRAWING

The single figure of the drawing illustrates, in block diagram form, a process for manufacturing the shape of the present invention.

DESCRIPTION OF THE PREFERRED EMBODIMENT

The present invention relates to a novel shroud tube composition and method of manufacture thereof. In particular, the method of manufacture uses injection molding techniques as a means of forming the shape because injection molding requires relatively low capital investment and achieves a high rate of production.

Referring now specifically to the figure of the drawing, there is disclosed in block form the preferred method for manufacturing shapes such as shroud tubes, according to the present invention. In particular, the method uses relatively low capital cost, highly productive, injection molding techniques to form the shroud tubes. Initially, at station 10, the composition from which the tube is manufactured is mixed. The composition comprises synthetic alumina, calcined fluidized bed coke, a spall inhibiting additive, fine silicon, and reactive alumina. Since injection molding techniques are utilized, experience in forming ceramics by injection molding in which the lowest possible binder level is employed, has indicated that the batch grind should be approximately 7% 8/10 mesh; 18% 10/28 mesh; 15% 28/65 mesh; 17% 65/325 mesh; and 43% -325 mesh. All mesh sizes referred to herein are made with reference to Tyler Screen standards. The distribution of the $-325$ mesh particles is important in injection molding formulations. Generally, the particle distribution should be 89% finer than 20 microns, 72% finer than 10 microns, 52% finer than 4 microns, 40% finer than 2 microns, and 28% finer than 1 micron. As illustrated in the following examples, the preferred formulation comprises 3 weight percent micronized silicon; 13 weight percent $-325$ mesh reactive alumina; 15 weight percent calcined fluidized bed coke sized 28/65 mesh; at least 15 weight percent of a spall inhibiting additive; and the balance synthetic alumina. Silicon carbide sized 8/16 mesh was found to be a useful spall inhibiter.

At station 12, a high carbon yielding resin and a curing aid are added to the mix formed at station 10. The mix formed at station 10, plus the additives added at station 12 are mixed at room temperature to a moldable consistency. At station 14, the mix is injection molded to form the desired tubular shaped objects. At station 16, the tubular shaped objects are cured in the mold.

At station 18, the objects are removed from the mold. At station 20, the shapes are dried at 121° C. for a predetermined period of time, for example, 4-10 hours. At station 22 the shapes are coked at a relatively high temperature, for example 1093° C. If desired, the shapes may be tar impregnated at station 24 to increase the shapes' resistance to molten mold powder.

The following examples will describe details of the mix formulation with the additions furnished at station 12, together with the use of such mix and additives in the process described hereinabove.

EXAMPLE 1

A mix was formulated at stations 10 and 12 at 121° C. using a binder system comprising 9 weight percent of a high carbon yielding solid resin comprising a mixture of di- and tri-hydroxy diphenyl and other high molecular weight phenolic compounds, as for example, the resin sold by Koppers Company, Inc. under the trademark "PENACOLITE RM 441". Two weight percent ethylene glycol and 1.5 weight percent of a stearic acid amide functioning as a dispersant were mixed with the high carbon yielding resin. Injection molding of the shape was done at 14 Kg/cm² into a mold precoated with a graphite spray and preheated to 43° C. In the preferred embodiment, the shape was tubular with the end product being used as a shroud tube. After maintaining a hold pressure of 14 Kg/cm² for a few minutes, the mold was cooled to room temperature and the tube removed. The tube was then packed into sand for support. The sand contained about 30 weight percent hexamethylenetetramine ("hexa"). A slow heat up rate under an argon atmosphere was necessary in order to prevent the resin from bubbling and to set the resin using vapors emanating from decomposition of hexa. Cut section examination after coking indicated the tube was dense and free of defects. It had a bulk density of 2.50 g/cc and an apparent porosity of 18.2% (Table 1). Its cold crushing strength was 257 Kg/cm² and its hot crushing strength at 1538° C. was 205 Kg/cm² For comparison, the hot crushing strength of alumina graphite tubes at 1538° C. ranges from 89 to 107 Kg/cm². Calculations indicated that about 5 percent carbon had been derived from pyrolysis of the binder. The tube was unaffected in a severe thermal shock test which involved passing a tip of an oxygen-propane flame over the tube. In addition, the tube was unaffected in a mold powder reaction test which involved placing mold powder in the tube and heating the tube to 1538° C. for 5 hours under reducing conditions. Cut section examination after this test indicated that no reaction had occurred. In contrast, fused silica tubes were severely altered in the mold powder test. This tube appeared to be equivalent in these tests to isopressed alumina-graphite. These tests suggested that this composition has potential as a shroud tube in the continuous casting of steel.

EXAMPLE 2

Another mix was formulated at stations 10 and 12 using a binder comprising 7 weight percent of an aqueous high carbon yielding resin. The actual resin used was an aqueous version of the resin described in Example 1, and is based on 80% solids, sold under the trademark "PENACOLITE RM 441-80" by the Koppers Company, Inc. Five and one-half percent of a polysaccharide, functioning as a plasticizer and 1% paraformaldehyde were mixed with the aqueous resin. The polysaccharide plasticizer used in the mix is sold by the Pillsbury Company under the trademark "POLYTRAN L". This mix was made at room temperature and molded at 14 Kg/cm² into a mold also at room temperature. After injection, the mold cavity was sealed off by means of a slide gate to maintain hold pressure. the mold was then heated at 65° C. At this temperature, paraformaldehyde spontaneously decomposes releasing formaldehyde vapors which can cure the resin. Of many different types of high carbon yielding resins tested, only Kopper's "RM 441" was capable of curing at 65° C. by reaction with formaldehyde. After holding at 65° C. for about 10 minutes, the mold was cooled to room temperature and the tube was hard enough to be stripped from the mold. The tube was further dried at 121° C. to safely remove water from the binder. The tube was then fired under reducing conditions at a rate of 204° C./hr. to 1093° C. with a 5-hour hold. The bulk density on this tube was 2.43 g/cc and the apparent porosity was 18.9%. The room temperature modulus of rupture was 129 Kg/cm$^2$ Typically, the room temperature MOR of isopressed alumina-graphite tubes ranges from 50 to 91 Kg/cm$^2$. The main problems with this mix were the obnoxious odor of paraformaldehyde and a short working time. A noticeable change in rheology of the mix occurred at room temperature after about 4 hours due to initial setting of the resin. It was found that minor additions of oleic acid, which functions as a dispersant, or of a water miscible oil, greatly extended the shelf life of the mix. In the actual testing, one mix used an oleic acid sold under the trademark "DARVAN No. 7" as the dispersant, and another mix used a water miscible oil sold under the trademark "STAYSOL 77" as an alternative to the DARVAN. In forming the mixes using either the oleic acid or the water miscible oil, the polysaccharide plasticizer was omitted. The additions of oleic acid or the water miscible oil to the mix had to be maintained under 2 weight percent, or the tube was too weak when stripped from the mold.

EXAMPLE 3

A mix similar to that in Example 2 was made, but the binder comprised 7 weight percent of the high carbon yielding resin (RM 441-80), 4.75% polysaccharide plasticizer (POLYTRAN L), and 0.75% paraformaldehyde. This composition was molded at 24 Kg/cm$^2$. Its bulk density after coking was 2.50 g/cc and the apparent porosity was 17.6%. The modulus of rupture at room temperature was 157 Kg/cm$^2$ and at 1093° C. was 183 Kg/cm$^2$. Calculations indicated that 3.5% carbon was derived from pyrolysis of the binder. Examples 2 and 3 illustrate that injection molding mixes could be made at room temperature by using aqueous resin and safely solidifying the shape under the confines of a mold at a low temperature (under 100° C.).

EXAMPLE 4

Typically, phenolic resins which use hexa as a curing agent, must be cured at 150° C. or higher. This precludes the use of water dispersed resins or resins with low boiling point solvents as vehicles for injection molding because of the dangers of exploding the mold during curing. To alleviate this danger, it was decided to investigate the curing of phenolic resins at lower temperatures by adding acid catalysts to the resin containing mix. A mix was made at stations 10 and 12 using 7 weight percent of a water soluble resole, high carbon yielding phenolic resin, such as Plastics Engineering Company's (Plenco) "1603" resin, having a viscosity of 170 cps at 25° C. One weight percent oleic acid, 6 weight percent polysaccharide plasticizer, and 1 weight percent of a 50/50 solution of HCl (50 parts conc. HCl to 50 parts water) was added to the mix. It was determined that 1 weight percent acid solution was capable of curing the resin within 10 minutes after the mix had been elevated to 65° C. which is safely under the boiling point of water. A tube was molded under conditions described in Example 3. After coking at 1093° C., the tube had a bulk density of 2.29 g/cc and an apparent porosity of 24.5% (Table II). Many other acids, such as, phosphoric acid 85% grade, para-toluenesulfonic acid (pTSA) and iron chloride require much higher addition levels to achieve the same results.

EXAMPLE 5

Another mix was formulated using 10 weight percent of a resole-phenol formaldehyde high carbon yielding resin such as a resin sold by Borden Inc. under the trademark "Al 5395". This resin has a viscosity of 300 cps at 25° C. Two weight percent oleic acid and 2 weight percent of the polysaccharide plasticizer and 1 weight percent high strength HCl (25 parts conc. HCl to 75 parts water) were added to the high carbon yielding resin. Molding was done as described above. It was learned that this composition was unique in that it could be heated to 65° C. for a few minutes and, if cooled to room temperature, would become very hard. The tube was rigid during stripping from the mold and remained rigid during further reheating. After coking at 1093° C., this tube had a bulk density of 2.31 g/cc and an apparent porosity of 21.6%.

EXAMPLE 6

Other mixes were formulated with lower viscosity, high carbon yielding resins, such as Plenco's "689" resin having a viscosity of 90 cps at 25° C., and Borden's "FB-92" resin having a viscosity of 37 cps at 25° C. These resins did not provide a decrease in the binder requirement of the mix. This was unusual since conceptually one would think that a lower viscosity vehicle would result in a lower binder requirement. All of these resins could be also acid catalyzed to produce low temperature curing.

EXAMPLE 7

Preliminary studies showed that a liquid phenol formaldehyde high carbon yielding resin containing furfuryl alcohol sold by Borden under trademark "FB 128", was unusually sensitive to minor additions of HCl. This resin was not sensitive to other weaker acids such as iron chloride (FeCl$_3$). This resin contains less than 5 weight percent free phenol; its solid content is 72–78 weight percent, and it contains less than 7 weight percent free formaldehyde. As little as 1.5 weight percent HCl 25/75 solution added to the mix caused the resin to advance immediately. An addition of 0.5 weight percent acid had no effect on the viscosity of the mix even after a temperature of 93° C. was reached. An addition of 1 weight percent caused the mix to become warm which indicated the resin was beginning to advance. A mix was made with 9 weight percent of the "FB 128" resin, 2 weight percent oleic acid, 1 weight percent polysaccharide plasticizer, and 0.75 weight percent HCl 25/75 solution. This mix was stable at room temperature for at least 8 hours. A tube was molded as described earlier. After coking at 1093° C., this tube had a bulk density of 2.43 g/cc and an apparent porosity of 19.1 percent. The modulus of rupture at room temperature was 80 Kg/cm$^2$ and the hot crushing strength at 1538° C. was 153 Kg/cm$^2$. Tar impregnation of this tube followed by baking and recoking lowered the apparent porosity to 13.6 percent. Another tube was made of the same formulation but tar impregnated after curing and then coked. This tube had a bulk density of 2.48 g/cc and an apparent porosity of 17.5 percent. A long term mold powder test for 10 hours at 1538° C. under reducing conditions showed that tar impregnated tubes had better resistance than unimpregnated tubes.

EXAMPLE 8

Further work was done with a lower viscosity version of Borden's "FB 128" resin (viscosity 90-120 vs 470-700 cps). This resin sold under the trademark "FB 160" is also a liquid phenol formaldehyde with furfuryl alcohol, but it contains about 10 percent less solids. This resin is unique in that it contains 15-20 weight percent free phenol. Its free formaldehyde content is less than 0.3 weight percent. A mix was made from 2 weight percent "Al 5395" resin, 7 weight percent "FB 160" resin, 2 weight percent oleic acid, and 0.75 weight percent HCl 50/50 solution. After molding, curing, and coking at 1093° C., this tube had a bulk density of 2.50 g/cc and an apparent porosity of 17.2 percent.

EXAMPLE 9

It was found that a moldable consistency could be achieved at a lower binder level by using "FB 160" resin thinned by a solvent such as ethyl alcohol. A mix was made with 1.9 weight percent ethyl alcohol, 8 weight percent "FB 160" resin, and 0.5 weight percent concentrated HCl. After shape forming and processing, this tube had a bulk density of 2.64 g/cc and an apparent porosity of 14.6 percent. The addition of concentrated HCl late in the mixing sequence did not have a negative effect on the rheology of the mix. In fact, this minor addition made the mix more fluid. These mixes are stable for a few days at room temperature, but unstable after mixing when exposed to modest temperatures over 38° C. Tar impregnation of this tube followed by baking and recoking lowered the apparent porosity to 10.5%.

The resin of Example 9 has a high free phenol content. Phenols are excellent wetting agents. It has been found that the resin of Example 9 having high free phenol content, very low free formaldehyde content also has a high tolerance for the addition of curing acids. That is to say that, unlike most resins which immediately cure upon the addition of acids, the resin of Example 9 has the capability to accept a curing agent such as concentrated hydrochloric acid at room temperature, without developing a significant increase in viscosity. This find was most unexpected because the addition of concentrate HCl acid to most resole-containing mixes immediately causes a loss to its injectable consistency. In view of this characteristic, by regulating the amount of acid added to the mix, controlled curing of the mix will occur. The foregoing results in better physical properties for shroud tubes produced from the mix.

In all of the above examples, it is implied that one could elect to form these tubes at a forming pressure higher than 24 Kg/cm$^2$. If this were done, the mixes would need less binder to achieve compaction. Both higher forming pressure and less binder would result in improved tube properties such as density and strength. The main advantage of very low pressure injection molding is the relatively inexpensive equipment needed for molding. Each interval of higher pressure used for forming requires upgrading to more expensive molding equipment.

Although specific mix proportions have been described, the mix composition may be varied within the following ranges: 1-8 weight percent fine silicon; 1-16 weight percent −325 mesh reactive alumina; 1-30 weight percent calcined fluidized bed coke, sized 28/65 mesh; 1-30 weight percent spall inhibiting additive; and the balance of the mix synthetic alumina. Based upon experience in developing mixes for shroud tubes or the like, the foregoing ranges for the various components forming the mix will provide a commercially practicable batch.

TABLE I

Mixes Made with PENACOLITE RM 441

| Coked Properties | Example: 1 | 2 | 3 |
|---|---|---|---|
| Density, g/cc: | 2.50 | 2.43 | 2.50 |
| Apparent Porosity, %: | 18.2 | 18.9 | 17.6 |
| Modulus of Rupture, Kg/cm$^2$ | | | |
| at Room Temperature: | — | 129 | 157 |
| at 1093° C.: | — | 147 | 183 |
| Cold Crushing Strength, Kg/cm$^2$: | 257 | — | — |
| Hot Crushing Strength at 1538° C. Kg/cm$^2$: | 205 | — | — |
| Flame Impingement Test: | Passed | — | — |
| Mold Powder Reaction Test: | Unaffected | — | — |

TABLE II

Mixes Made with Resole Resins

| Example: | | | | | |
|---|---|---|---|---|---|
| Coked Properties | | | | | |
| Bulk Density, g/cc: | 2.29 | 2.31 | 2.43 | 2.50 | 2.64 |
| Apparent Porosity, %: | 24.5 | 21.6 | 19.1 | 17.2 | 14.6 |
| Modulus of Rupture Kg/cm$^2$ | | | | | |
| at Room Temperature: | — | — | 80 | — | — |
| at 1093° C.: | — | — | — | — | — |
| Cold Crushing Strength, Kg/cm$^2$: | — | — | — | — | 839 |
| Hot Crushing Strength at 1538° C., Kg/cm$^2$: | — | — | 153 | — | — |
| Tar Impregnation and Recoking | | | | | |
| Apparent Porosity, %: | — | — | 13.6 | — | 10.5 |
| Flame Impingement Test: | — | — | — | — | Passed |
| Mold Powder Reaction Test: | — | — | — | — | Unaffected |

While a preferred embodiment of the present invention has been described and illustrated, the invention should not be limited thereto, but may otherwise embodied within the scope of the following claims.

The embodiments of the invention in which an exclusive property or privilege is claimed are defined as follows:

1. A method for manufacturing an alumina-carbon shaped object comprising the steps of:
   mixing 1-8 weight percent fine silicon, 1-16 weight percent reactive alumina, 1-30 weight percent calcined fluidized bed coke, 1-30 weight percent of a spall inhibiting additive, and the balance of the mix synthetic alumina with the additions of 5-10 weight percent of a high carbon yielding resin as a molding vehicle, 0.5–4 weight percent solvent and up to 2 weight percent of a low temperature curing agent;

injection molding the mix to produce shaped objects;

initially curing the shapes at a temperature less than 100° C.;

stripping the shape from the mold;

further curing the shape at a temperature above 100° C.; and enhancing the strength of the shape by heating the shape at a relatively high temperature above 550° C. to promote coking of the resin molding vehicle.

2. A method in accordance with claim 1 further including the step of:

impregnating the shaped object with tar to decrease coked porosity and to increase the resistance of the shape to molten mold powder.

3. A method in accordance with claim 2 wherein the spall inhibiting additive is silicon carbide.

4. A method in accordance with claim 1 wherein the fine silicon comprises 3 weight percent, said reactive alumina comprises 8 weight percent, said calcined fluidized bed coke comprises 15 weight percent.

5. An alumina-carbon shape made from a batch consisting essentially of, by weight, 1–8 percent fine silicon, 1–16 percent reactive alumina, 1–30 weight percent calcined fluidized bed coke, 1–30 percent of a spall inhibiting additive, and the balance of the mix synthetic alumina, plus the additions of 5–10 weight percent of a high carbon yielding resin as a molding vehicle, 0.5–4 percent solvent, and 0.5–2 weight percent of a low temperature curing agent.

6. An alumina-carbon shape in accordance with claim 5, wherein the shape is formed as a shroud tube.

7. An alumina-carbon shape in accordance with claim 5, wherein the micronized silicon comprises 3 weight percent, the reactive alumina comprises 8 weight percent, and the calcined fluidized bed coke comprises 15 weight percent.

8. An alumina-carbon shape in accordance with claim 5, wherein the spall inhibiting additive is silicon carbide.

9. An alumina-carbon shape in accordance with claim 5, wherein the high carbon yielding resin is a liquid resin composed of a mixture of di- and tri-hydroxy diphenyl and other high molecular weight phenolic compounds and paraformaldehyde is used as a low temperature curing agent.

10. An alumina-carbon shape in accordance with claim 5, wherein the high carbon yielding resin is a liquid phenol formaldehyde resin with a viscosity of 90–120 centipoise at 25° C., a relatively high free phenol content, and a relatively high tolerance for strong acids which can be used to initiate a low temperature cure.

* * * * *